S. TAMURA AND M. WATANABE.
MOTOR CAR OF SMALL TYPE.
APPLICATION FILED AUG. 1, 1918.

1,328,909.

Patented Jan. 27, 1920.
3 SHEETS—SHEET 1.

Witnesses:
Sugao Soya
Hikotaro Sagawa

Inventors:
Shinkichi Tamura
Masanori Watanabe

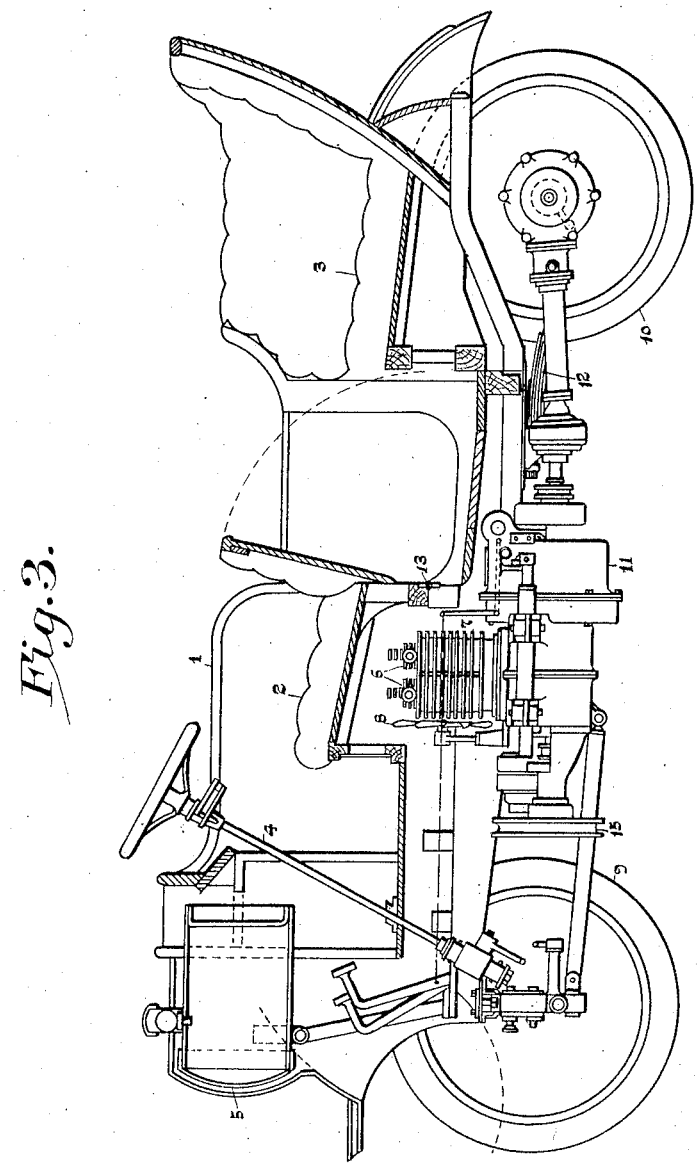

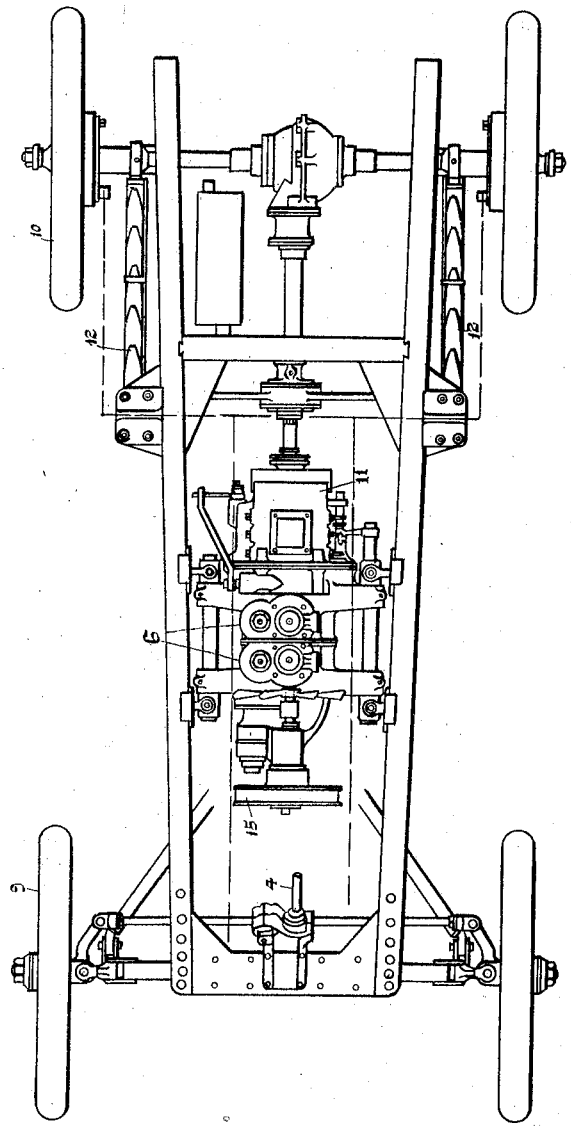

UNITED STATES PATENT OFFICE.

SHINKICHI TAMURA, OF KOBE, AND MASANORI WATANABE, OF TOKYO, JAPAN; SAID WATANABE ASSIGNOR TO SAID TAMURA.

MOTOR-CAR OF SMALL TYPE.

1,328,909.  Specification of Letters Patent.  Patented Jan. 27, 1920.

Application filed August 1, 1918. Serial No. 247,882.

*To all whom it may concern:*

Be it known that we, SHINKICHI TAMURA and MASANORI WATANABE, subjects of the Emperor of Japan, and the former residing at No. 11 Nakayamate-Dori Gochome, Kobe, Japan, and the latter at No. 39 Takecho, Shitaya, Tokyo, Japan, have invented certain new and useful Improvements in Motor-Cars of Small Type, of which the following is a specification.

This invention has reference generally to improvements in motor vehicles and more particularly relates to an improved passenger automobile.

The invention consists in arranging the engine approximately medially of the frame of the vehicle while the body is designed with a space beneath the driver's seat to accommodate the engine and in addition the steering rod and other mechanisms therefor and brought on a center line in front of said seat, the object being to utilize the whole part of the car body with an improved seating arrangement without necessitating the changing of the size of the car.

The invention is clearly illustrated in the accompanying drawings, in which:—

Figure 1:
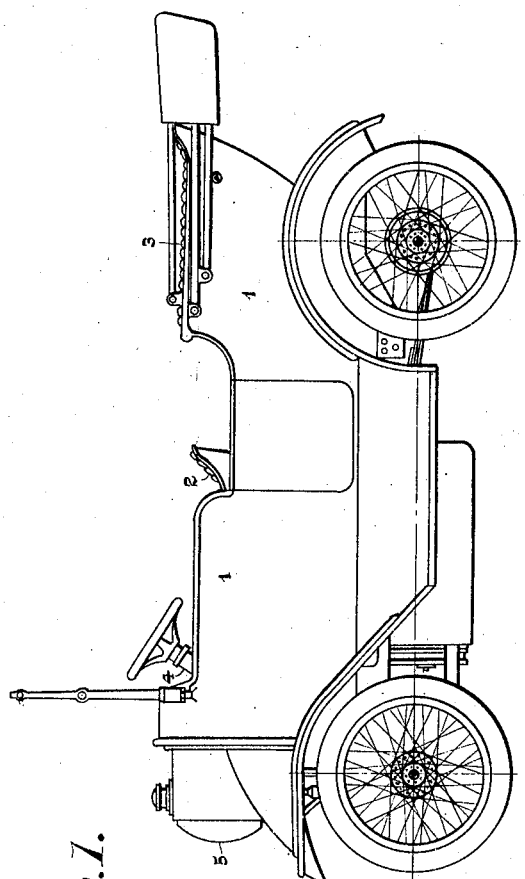
Figure 2:
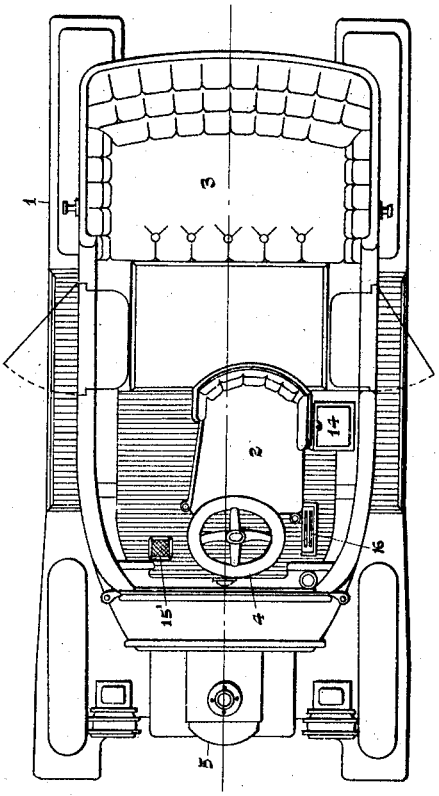

Figure 1 is a side elevation of the improved motor vehicle, Fig. 2. is a top plan view thereof, Fig. 3. is an enlarged longitudinal sectional view, and, Fig. 4 is a top plan view of the chassis with the body removed.

Similar characters of reference are employed in all of the above described views, to indicate corresponding parts.

Referring now, more particularly, to the accompanying drawings there is provided a body generally designated by the numeral 1 having a central opening medially of the bottom over which is positioned a driver's seat 2, also arranged substantially medially of the sides of the car body while a passenger seat 3 is arranged across the rear end of the body.

The steering means 4 including the column, the post and the wheel of a conventional construction are arranged directly in front of the driver's seat and are operably connected directly with the connecting rod between the steering front wheels 9 which together with rear wheels support the chassis 8' while the latter in turn supports the body. An engine 6 of the vertical type is supported medially of the ends of the frame or chassis and is positioned in the space beneath the driver's seat, the rear portion of the latter being preferably hinged at its lower edge as at 13 so that access may be had to the engine from within the body of the car when it is designed to make repairs thereto, etc.

A volatile oil tank 5 is mounted at the forward end of the body 1 and the bottom of the forward portion of the body is mounted so as to be spaced from the chassis leaving a space which constitutes an air passage for cooling the motor or engine. In addition a fan 8 is operably mounted in advance of the engine 6 for insuring of a direct application of air to the cylinders for cooling purposes.

To facilitate the proper supporting of the body on the chassis the spring 12 is provided for balancing the weight which comes upon the rear wheels as a result of arranging the engine in the middle part of the chassis.

By arranging the driver's seat between the sides of the body spaces are left between the seat and the sides of the car body to permit the driver to gain access to the seat while in addition a tool box 14 is mounted on one side of the seat, being arranged in one of such spaces.

The starting mechanism is designated by the numeral 15, 15' representing the operating part thereof and with the braking and speed change pedals 16 are arranged within convenient range of the driver so as to be easily operated. In the usual or present type of passenger cars, the vertically disposed engine is positioned at the front end of same therefore it is always necessary to provide the hood which is rather objectionable as far as the arrangement of the seats or the use of such space is concerned. Moreover a steering rod is arranged near the rear part of the vehicle and is passed to one side thereof and extended in front of the driver's seat. As a result of this arrangement the driver cannot choose his position in the car but is obliged to sit at the side where the steering rod is arranged, causing an unbalancing of the car or an unequal distribution of weight of the occupant and at the same time making it difficult for the driver to observe both sides of the car when driving. As it is a vehicle regulation in some countries, that no one but the driver may be seated in front of the car it is therefore apparent that by extending the front seat across the front of the body useless seating space is left next to the driver whereas with the present arrangement of driver's seat the driver may readily observe the road and other vehicles, etc., in addition to being able to conveniently operate the car.

By arranging the engine medially of the ends of the car an equal distribution of the weight thereof is placed on the front and rear wheels which has a tendency to obviate the objectionable skidding action of the car while driving, as such skidding action is chiefly due, in the present type of cars to the arranging of the engine near the front end subjecting the front wheels to the heaviest weight.

In the present motor vehicle, the engine being arranged medially of the ends of the chassis and partly in the space beneath the driver's seat obviates the provision of the usual hood. As a result the car is designed so as to conveniently seat the passengers and the driver in such a manner that the latter may at all times observe both sides of the car and have sufficient room to conveniently operate the same. Finally the provision of the air space or passage permits of cooling of the engine by direct application of air.

It is believed in view of the foregoing description that a further detail description of the operation of the invention is entirely unnecessary. Likewise it is believed that the advantages of the invention will be readily apparent.

We claim—

1. A device of the character described including, in combination, a supporting chassis, front and rear wheels connected thereto, an engine supported medially of the ends of the chassis, a body on the chassis and provided with an opening in the bottom for accommodating the head of the engine, a driver's seat arranged over the opening in the body and having the lower edge of its rear portion hinged to the bottom, connecting means between the front wheels and steering means forwardly of the driver's seat and the engine and directly connected with the front wheels.

2. A device of the character described, including in combination, a supporting chassis, an engine mounted medially of the ends thereof, a body on the chassis having an opening in the bottom for accommodating the head of the engine and having the forward portion of the bottom spaced from the chassis and the engine to leave an air cooling passage for the engine, and a driver's seat hinged over the opening in the bottom and accommodating the head of the engine.

In testimony whereof we have hereunto set our hands in presence of two subscribing witnesses.

SHINKICHI TAMURA.
MASANORI WATANABE.

Witnesses:
    SUGAO SOGA,
    HIKOTARO SAGAWA.